US011252124B2

(12) United States Patent
King et al.

(10) Patent No.: US 11,252,124 B2
(45) Date of Patent: Feb. 15, 2022

(54) ELECTRONIC MESSAGING SYSTEMS

(71) Applicant: VNP Software, Inc., Atlanta, GA (US)

(72) Inventors: Paul King, Atlanta, GA (US); Neil Stephen Barry Martin, Chicago, IL (US)

(73) Assignee: VNP Software, Inc., Atlanta, GA (US)

( * ) Notice: Subject to any disclaimer, the term of this patent is extended or adjusted under 35 U.S.C. 154(b) by 0 days.

(21) Appl. No.: 16/732,503

(22) Filed: Jan. 2, 2020

(65) Prior Publication Data

US 2020/0153779 A1    May 14, 2020

Related U.S. Application Data

(63) Continuation of application No. 15/148,743, filed on May 6, 2016, now Pat. No. 10,530,730, which is a continuation of application No. 14/223,576, filed on Mar. 24, 2014, now Pat. No. 9,338,124, which is a continuation-in-part of application No. 13/253,174, filed on Oct. 5, 2011, now Pat. No. 8,682,991.

(Continued)

(51) Int. Cl.
*H04L 12/58*     (2006.01)
*G06Q 10/10*     (2012.01)
*H04L 29/08*     (2006.01)
*G06F 15/16*     (2006.01)
*H04N 21/4728*   (2011.01)

(52) U.S. Cl.
CPC ........... *H04L 51/32* (2013.01); *G06Q 10/107* (2013.01); *H04L 51/20* (2013.01); *H04L 67/18* (2013.01); *G06F 15/16* (2013.01); *H04L 51/00* (2013.01); *H04N 21/4728* (2013.01)

(58) Field of Classification Search
CPC ..................................................... H04L 51/32
See application file for complete search history.

(56) References Cited

U.S. PATENT DOCUMENTS 5,715,278 A    2/1998  Croft et al.
6,640,097 B2  10/2003  Corrigan et al.
(Continued)

OTHER PUBLICATIONS

Final Office Action, dated Nov. 30, 2017, from corresponding U.S. Appl. No. 15/148,743.

(Continued)

*Primary Examiner* — James A Edwards
(74) *Attorney, Agent, or Firm* — Brient IP Law, LLC

(57) ABSTRACT

A computer system for facilitating communications between users is configured for: (A) receiving, from a first user, one or more user watch area attributes; (B) using the one or more user watch area attributes to define a watch area; (C) receiving, from a second user, a message associated with a geographical location; (D) determining whether the geographical location is located within the user watch area; (E) at least partially in response to determining that the geographical location is located within the user watch area, subscribing the first user to a thread of messages that includes the message; and (F) dynamically adjusting a shape of the user watch area based, at least in part, on a factor selected from a group consisting of: (1) a number of message postings within the user watch area; and (2) a population density of an area that is within the user watch area.

11 Claims, 11 Drawing Sheets

Related U.S. Application Data

(60) Provisional application No. 61/390,179, filed on Oct. 5, 2010.

(56) References Cited

U.S. PATENT DOCUMENTS

| | | | |
|---|---|---|---|
| 6,888,929 B1 | 5/2005 | Saylor et al. | |
| 7,424,175 B2 | 9/2008 | Lipton et al. | |
| 7,590,941 B2 | 9/2009 | Wee et al. | |
| 8,024,330 B1 | 9/2011 | Franco et al. | |
| 8,102,281 B2 | 1/2012 | Ohki | |
| 8,107,979 B2 | 1/2012 | Kim et al. | |
| 8,495,152 B2 | 7/2013 | Seshadri | |
| 8,539,361 B2 | 9/2013 | Hardy et al. | |
| 8,621,022 B2 | 12/2013 | Buchheit et al. | |
| 9,171,293 B2 | 10/2015 | Ellanti | |
| 9,392,406 B2 * | 7/2016 | Houri | G01S 5/0263 |
| 2003/0061325 A1 * | 3/2003 | Monroe | H04L 67/12 709/223 |
| 2007/0161382 A1 | 7/2007 | Melinger et al. | |
| 2007/0281716 A1 * | 12/2007 | Altman | H04L 51/20 455/466 |
| 2007/0282621 A1 * | 12/2007 | Altman | G06Q 50/10 705/319 |
| 2009/0177384 A1 * | 7/2009 | Walder | G01C 21/3682 701/532 |
| 2009/0198681 A1 * | 8/2009 | Burnstein | G06Q 30/02 |
| 2009/0248807 A1 | 10/2009 | Fron et al. | |
| 2009/0258656 A1 * | 10/2009 | Wang | H04W 4/029 455/456.1 |
| 2011/0151898 A1 * | 6/2011 | Chandra | H04W 4/025 455/466 |
| 2011/0191425 A1 | 8/2011 | Brodeur et al. | |
| 2011/0197123 A1 | 8/2011 | Caine et al. | |
| 2011/0238762 A1 | 9/2011 | Soni et al. | |
| 2012/0323798 A1 | 12/2012 | Den Herder et al. | |
| 2016/0071325 A1 * | 3/2016 | Callaghan | H04W 4/02 345/633 |

OTHER PUBLICATIONS

Non-Final Office Action, dated Mar. 7, 2017, from corresponding U.S. Appl. No. 15/148,743.

Notice of Allowance, dated Aug. 30, 2019, from corresponding U.S. Appl. No. 15/148,743.

Notice of Allowance, dated Jan. 13, 2016, from corresponding U.S. Appl. No. 14/223,576.

Notice of Allowance, dated Nov. 4, 2013, from corresponding U.S. Appl. No. 13/253,174.

Office Action, dated Apr. 29, 2013, from corresponding U.S. Appl. No. 13/253,174.

Office Action, dated Jun. 4, 2015, from corresponding U.S. Appl. No. 14/223,576.

Office Action, dated Nov. 19, 2018, from corresponding U.S. Appl. No. 15/148,743.

* cited by examiner

ELECTRONIC MESSAGING SYSTEMS

CROSS-REFERENCE TO RELATED APPLICATIONS

This application is a continuation of U.S. patent application Ser. No. 15/148,743, filed May 6, 2016, which is a continuation of U.S. patent application Ser. No. 14/223,576, filed Mar. 24, 2014, now U.S. Pat. No. 9,338,124, which is a continuation-in-part of U.S. patent application Ser. No. 13/253,174, filed Oct. 5, 2011, now U.S. Pat. No. 8,682,991, which claims the benefit of U.S. Provisional Patent Application No. 61/390,179, filed Oct. 5, 2010, each of which is entitled "Electronic Messaging Systems," and each of which is hereby incorporated herein in its entirety.

BACKGROUND

Current messaging systems, such as Facebook and e-mail messaging systems, are focused on facilitating communication between users that know each other. For example, Facebook allows users to quickly send personal updates to multiple individuals who have been added to the user's list of "friends" over time.

In certain situations, it would be desirable to communicate messages to recipients on the basis of the recipients' interest in a particular location rather than the recipients' preexisting relationship with the sender of the message. This would allow users who have an interest in a common geographical area, but who do not necessarily know each other, to share information regarding the area. Various electronic messaging systems described below provide such functionality.

SUMMARY

In various embodiments, a computer system for facilitating communications between users is configured for: (A) receiving, from a first user, one or more user watch area attributes; (B) using said one or more user watch area attributes to define a watch area; (C) receiving, from a second user, a message associated with a particular geographical location, wherein said second user has indicated that said message should be associated with said particular geographical location; (D) determining whether said particular geographical location is located within said user watch area; (E) at least partially in response to determining that said particular geographical location is located within said user watch area, subscribing said first user to a thread of messages that includes said message; and (F) dynamically adjusting a shape of said user watch area based, at least in part, on a factor selected from a group consisting of: (1) a number of message postings within said user watch area; and (2) a population density of an area that is within said user watch area.

In various embodiments, a computer system for facilitating communications between users is configured for: (A) receiving, from a first user, one or more user watch area attributes; (B) using said one or more user watch area attributes to define a watch area; (C) determining whether said first user has entered a shared watch area; (D) at least partially in response to determining that said first user has entered said shared watch area, substantially automatically adding said shared watch area to said user watch area; (E) receiving, from a second user, a message associated with a particular geographical location, wherein said second user has indicated that said message should be associated with said particular geographical location; (F) determining whether said particular geographical location is located within said user watch area; (G) at least partially in response to determining that said particular geographical location is located within said user watch area, subscribing said first user to a thread of messages that includes said message; and (H) dynamically adjusting a size of said user watch area based, at least in part, on a population density associated with said user watch area.

In certain embodiments, a computer system for facilitating communications between users is configured for: (A) receiving, from a first user, one or more user watch area attributes; (B) using said one or more user watch area attributes to define a watch area; (C) receiving, from a second user, a message associated with a particular geographical location, wherein said second user has indicated that said message should be associated with said particular geographical location; (D) determining whether said particular geographical location is located within said user watch area; (E) at least partially in response to determining that said particular geographical location is located within said user watch area, subscribing said first user to a thread of messages that includes said message; and (F) dynamically adjusting a shape of said user watch area based, at least in part, on a factor selected from a group consisting of: (1) a number of message postings within said user watch area; and (2) a population density of an area that is within said user watch area.

BRIEF DESCRIPTION OF THE DRAWINGS

During the course of the discussion below, reference will be made to the accompanying drawings, which are not necessarily drawn to scale, and wherein:

FIG. 2 depicts a screen shot that includes a list of message threads 130-132, and FIG. 3 displays a screen shot that includes a particular message thread 132 and two particular messages 140, 141 within that thread.

DETAILED DESCRIPTION OF VARIOUS EMBODIMENTS

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

An electronic messaging system according to various embodiments comprises: (1) one or more computer servers (referred to collectively herein as "the system server"); (2) one or more user client devices on which a user client software program is installed; and (3) one or more communications networks for facilitating communication between the system server and the system's various user client devices. In particular embodiments, the user client devices may include, for example, a portable computing device (e.g., a laptop computer, a tablet computer, a cellular phone, or a GPS unit). User client devices may also include other types of computers, such as desktop computers.

Figure 1:
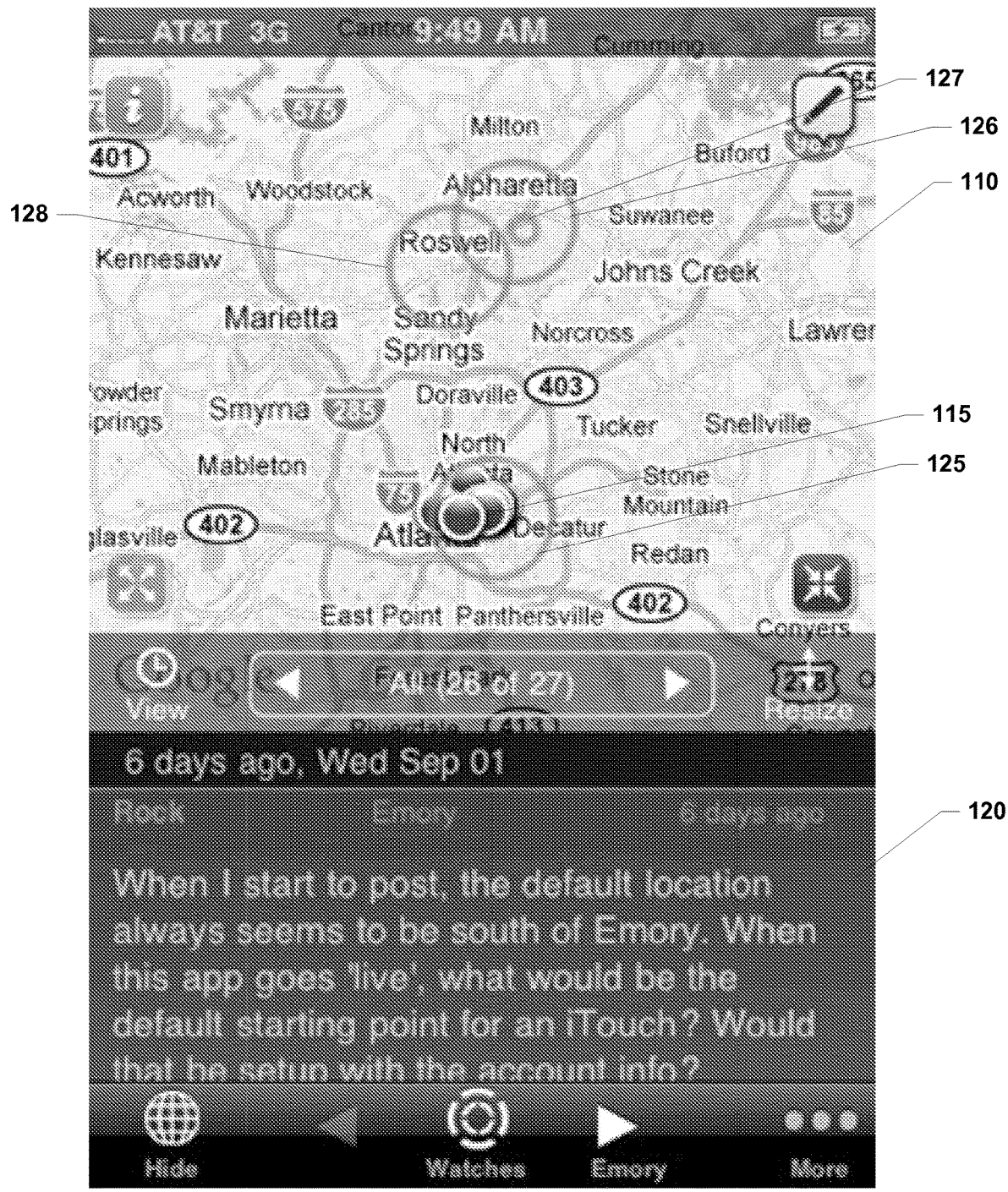
FIGS. 1-4 are screen shots of a user client device within an electronic messaging system according to a particular embodiment.
Figure 2:
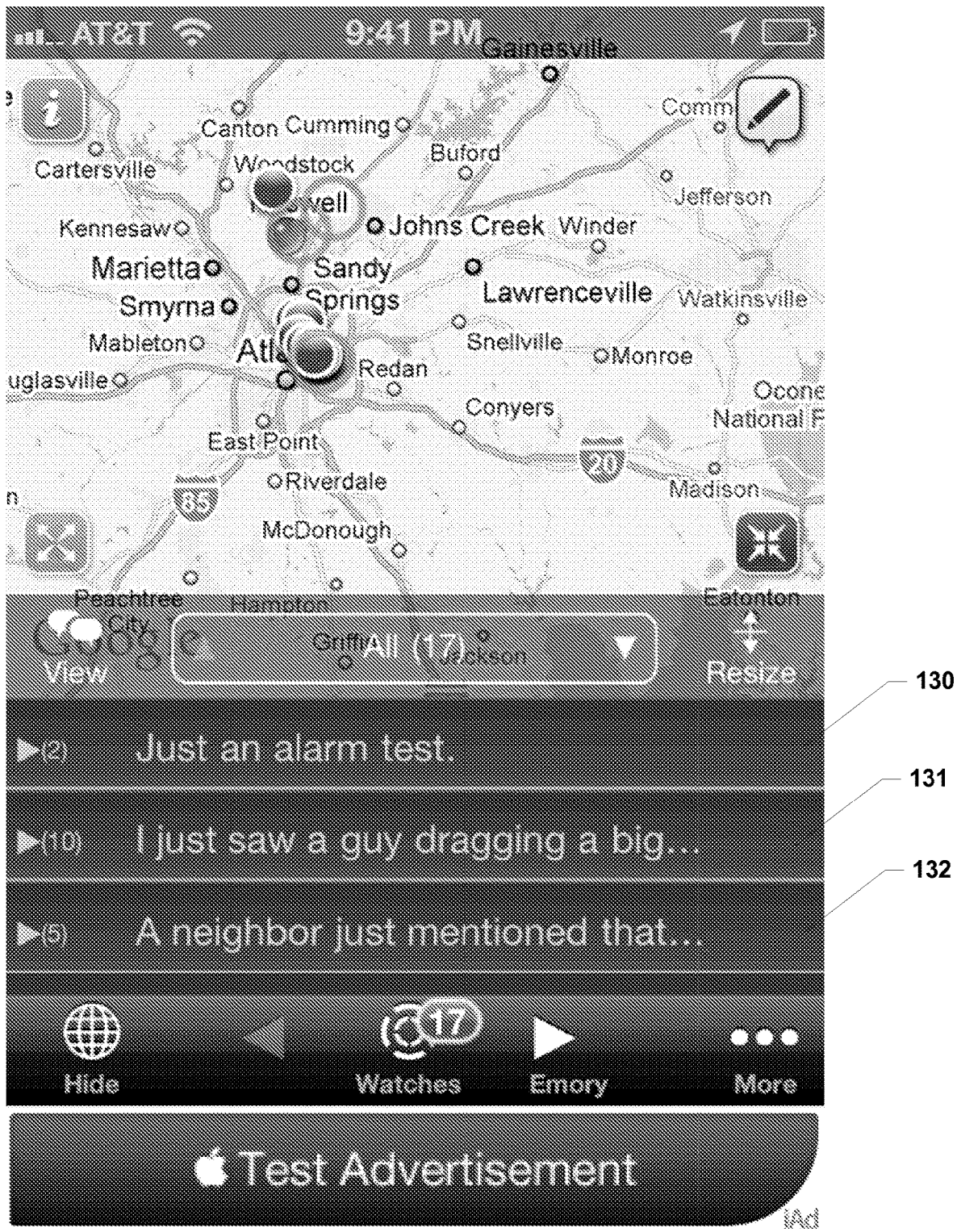
Figure 3:
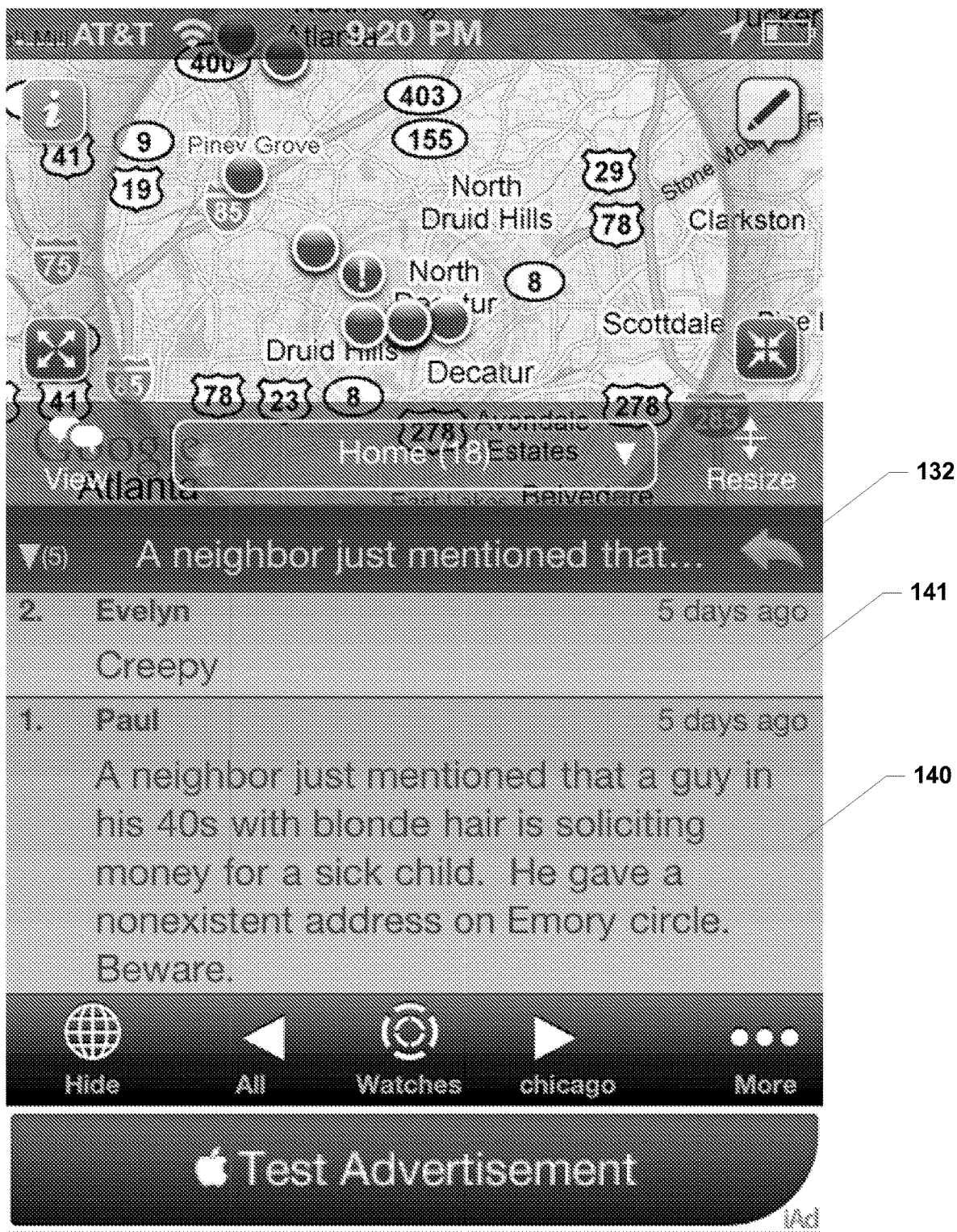
Figure 4:
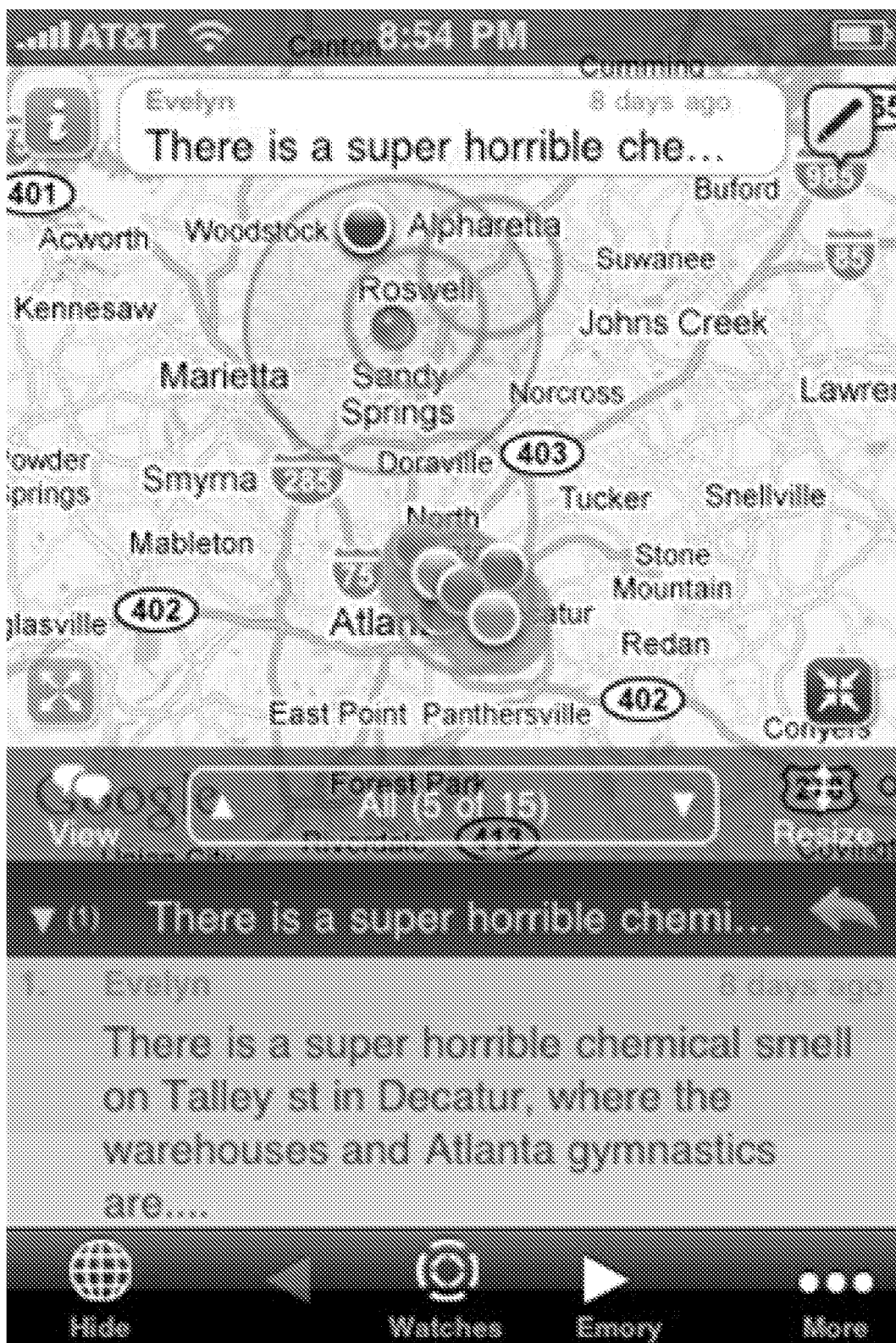
Figure 5:
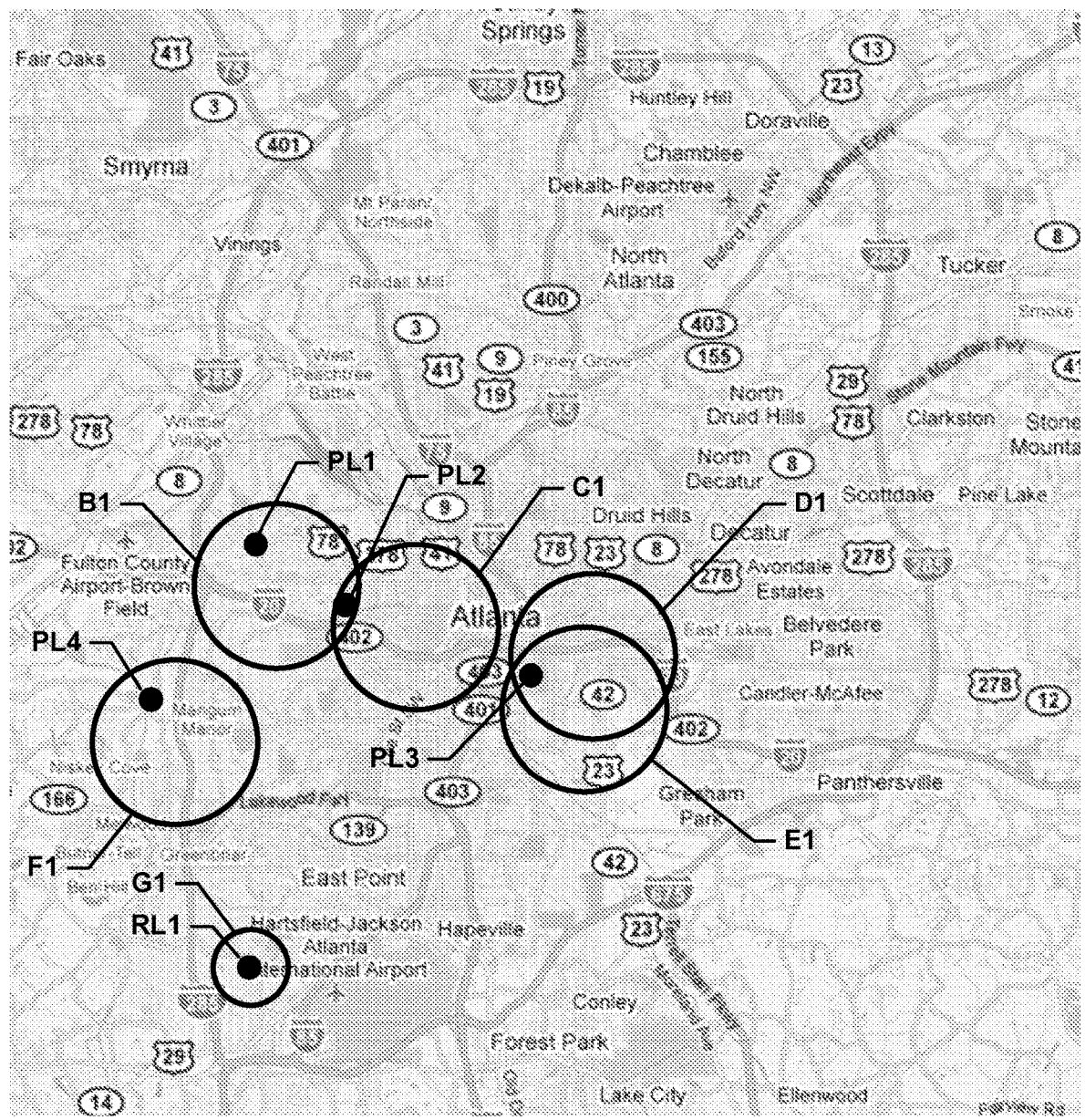
FIGS. 5-9 are maps that demonstrate various aspects of the functionality of an electronic messaging system according to a particular embodiment.
Figure 6:
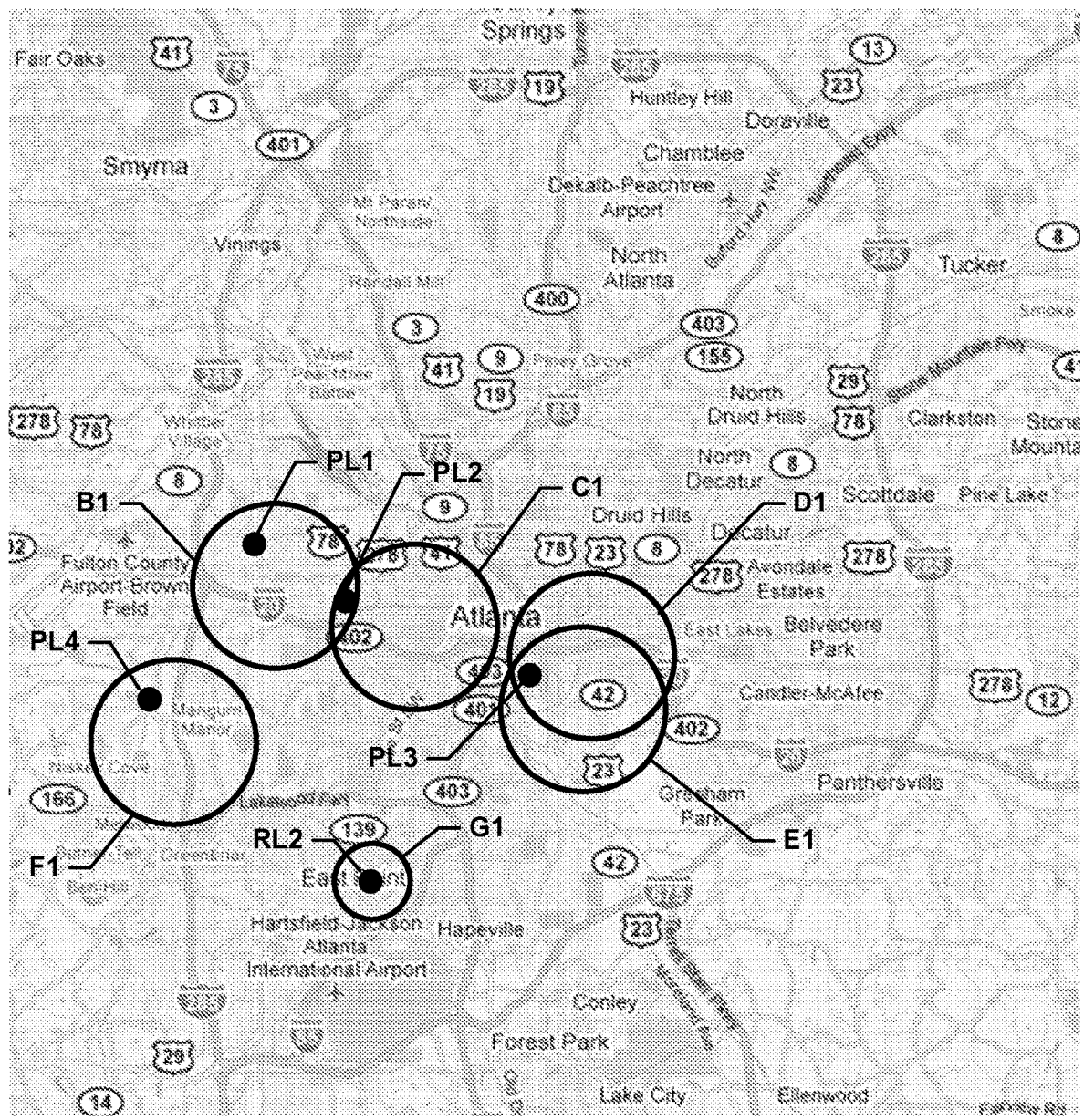
Figure 7:
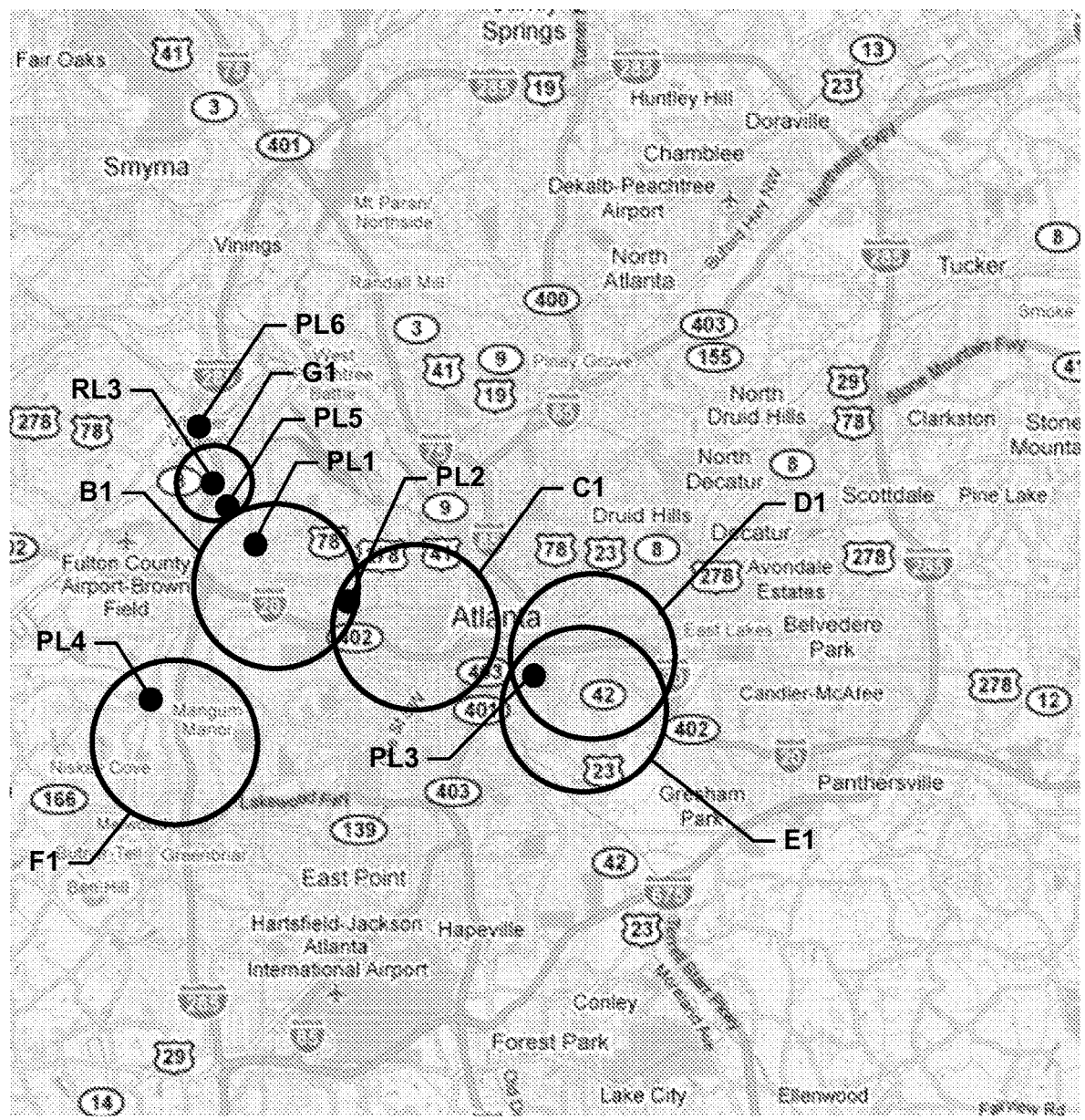
Figure 8:
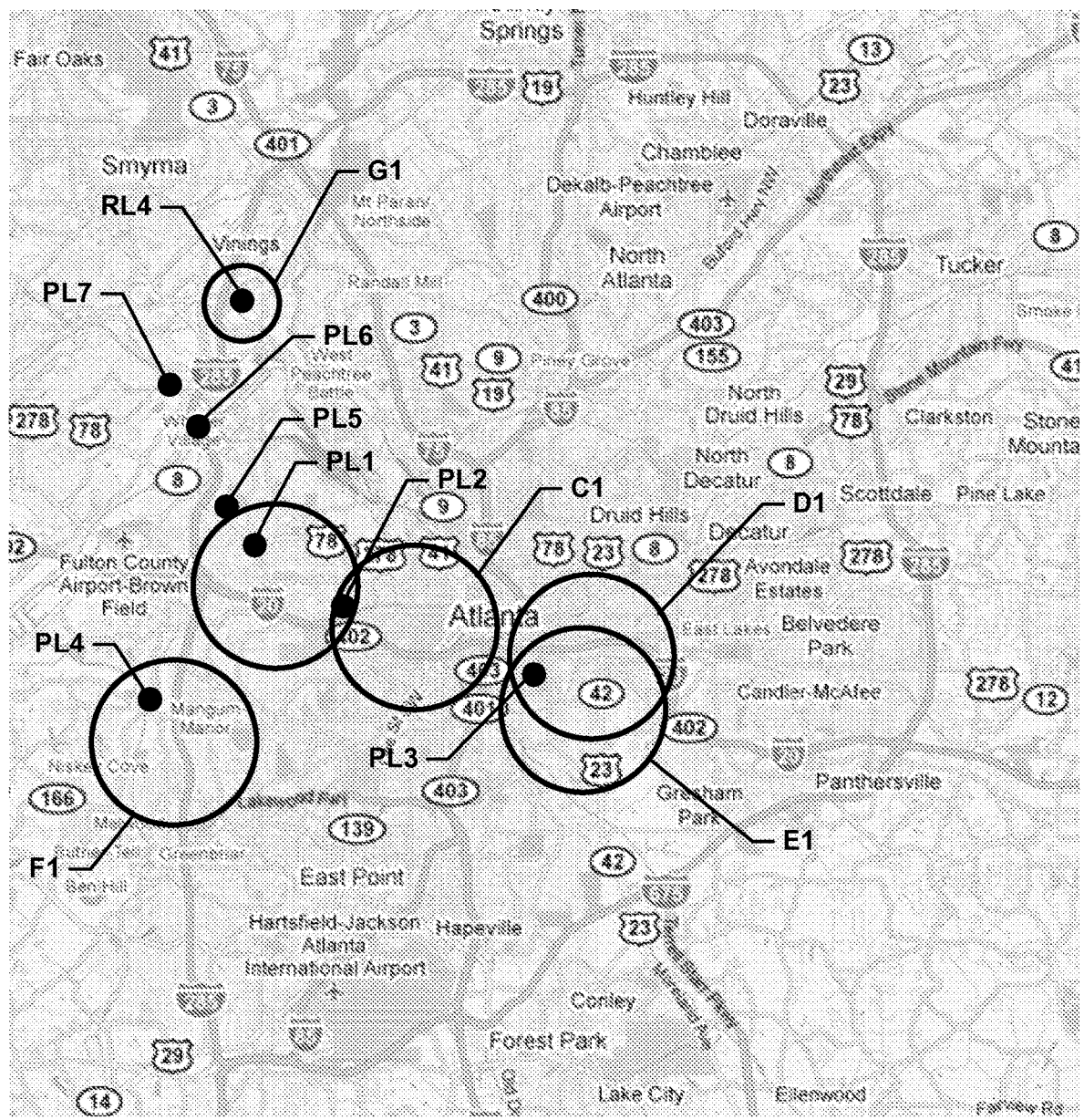
Figure 9:
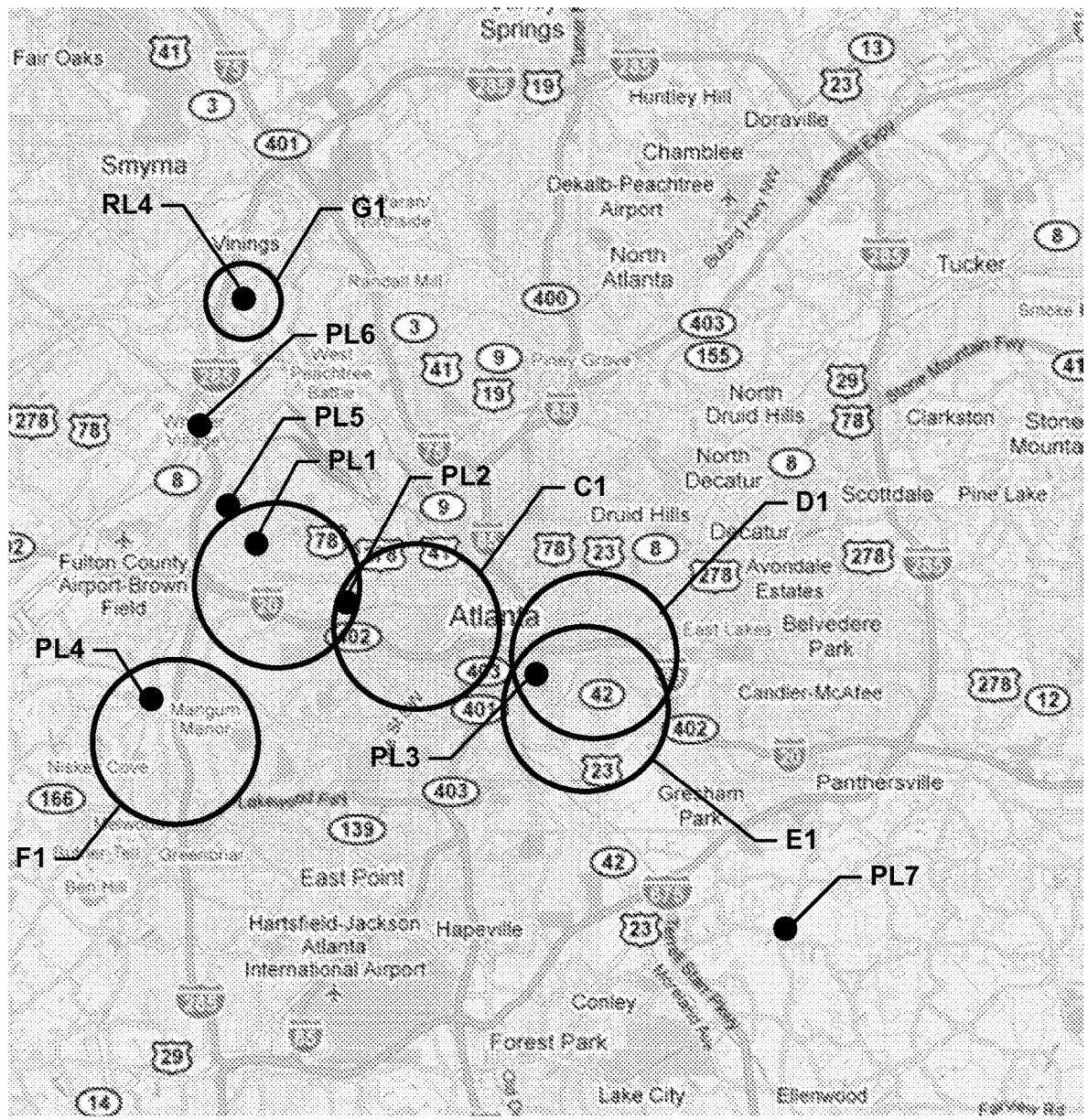

In particular embodiments, the electronic messaging system is adapted for facilitating communication between a group of users by allowing each of the users to post and receive messages on one or more user client devices. FIGS. 1-3 show exemplary displays of such a user client device. As may be understood, for example, from FIGS. 1-3, users may post a message 140, 141 within a particular message thread 132 and associate the message with a particular geographic location (e.g., by clicking on the particular geographic location on a map 110 that is displayed on the user's client device). The message is then delivered to any other users that are currently subscribed to the thread.

As shown in FIG. 1, in various embodiments, users may select and/or define a geographical zone of interest 125-128, which is referred to below as a user watch area. In particular embodiments, when a particular user watch area is in place for a first user and a second user posts a message and associates the message with a particular geographic location (a post location) within the particular user watch area, the messaging system automatically subscribes the first user to the message thread that is associated with the second user's message. This allows the first user to read, and contribute new messages to, any threads of messages that are associated with the first user's watch area. As shown in FIG. 1, in various embodiments, a user may read a particular message by selecting an icon 115 that indicates the particular location at which the message was posted.

The user watch area may be, for example: (1) a stationary watch area; or (2) a roaming watch area that is defined relative to the position of a movable object (e.g., a person or a particular user client device). For example, as discussed in greater detail below, a stationary user watch area may be defined as a substantially circular geographical area having: (1) its center at a particular static location (e.g., the user's home); and (2) a particular radius. Similarly, a roaming watch area may be defined as a substantially circular geographical area having: (1) its center at the location of a particular user client device (e.g., as defined by a GPS unit associated with the client device); and (2) a particular radius. Such a roaming watch area may, for example, allow a traveling user to monitor and contribute to message threads that are relevant to the user's immediate surroundings.

In particular embodiments, a user may define the shape of a particular user watch area in any of a variety of different ways. For example, the user may define the shape of the watch area by, for example, drawing the user watch area on a map displayed on a display screen associated with the user's user client device. In various embodiments, the system is adapted so that the user may define the shape of the watch area by, for example: (1) specifying both a center of a circular watch area and the desired radius of the watch area; (2) selecting various points that define a polygon-shaped watch area; or (3) drawing the watch area on a display screen.

In certain embodiments, the system may be configured to allow the system to automatically and dynamically determine an appropriate size and shape for the watch area. For example, the system may be adapted to dynamically modify the size and shape of the watch area based, for example, on such factors as: (1) the population density of an area that is within and/or adjacent the current watch area; (2) the number of message postings within an area that is within and/or adjacent the current watch area (either at a particular point in time, or over a predetermined period of time); and/or (3) any other suitable factor.

As a particular example, the system may automatically increase the radius of a circular roaming watch area in response to the watch area moving from a relatively densely populated area to a relatively sparsely populated area. Similarly, the system may automatically decrease the radius of a circular roaming watch area in response to the watch area moving from a relatively sparsely populated area to a relatively densely populated area.

As another example, the system may automatically increase the radius of a circular roaming watch area in response to the number of message postings within the watch area decreasing below a pre-defined number of messages. For example, in response to determining that a number of current message postings within the watch area is below a predetermined threshold number, the system may automatically expand the size of the watch area until the watch area includes the desired number of messages. Similarly, the system may automatically decrease the radius of a circular roaming watch area in response to the number of message postings within the watch area increasing above the pre-defined number of messages.

In other embodiments, the system may automatically change the general shape of the watch area so that it captures a desired number of messages and/or satisfies other predetermined criteria. For example, the system may change the watch area from a generally circular shape to a generally oval shape so that it includes and/or excludes certain message postings.

The system may also use the techniques described above to automatically adjust the watch area's size or shape in response to the number of messages posted during a particular time period: (A) being higher or lower than a particular threshold; or (B) changing by a predetermined amount.

Watch Roulette Feature

In various embodiments, certain messages and/or message threads ("threads") may be associated with a particular "channel" of communication. This allows a user to further filter the types of treads that the system will automatically subscribe a particular user to based on whether the threads are associated with a particular channel of interest. For example, in a particular embodiment, the user may specify that they only wish to subscribe to threads that are posted on a "tennis" channel. In one example, the system would only subscribe the user to threads that: (1) are specifically associated with the tennis channel; and (2) satisfy the geographical posting requirements discussed above. This might allow a user, for example, to easily contact and communicate with other users who are in the user's watch area (e.g., as defined, for example, as a circular area having a 2-mile radius centered at the user's home) who are interested in playing tennis.

In particular embodiments:

The system server maintains a set of channel records with an id and description, including a public channel.

Users are granted access to specific channels. By default, users only have access to the public channel.

When a user creates a new thread, the user client allows the user to specify which channel the thread should be associated with.

The channel for all messages within a thread is determined by the root (first) message for that thread.

When a user client requests thread data from the system server, the system server restricts the returned thread data to those that belong to channels that the user has access to.

Watch Roulette Feature

In various embodiments, the system is adapted to allow users to explore (e.g., in a substantially random manner) message threads that are not associated with any of the user's normal watch areas. In particular implementations, in response to receiving a request from a user to execute the watch roulette feature, the system randomly identifies a thread of messages and displays the thread to a user. In particular embodiments, the user may specify predetermined criteria that the thread must satisfy. For example, the user may specify that any thread to be displayed must: (1) include a message that is associated with a location that is within a predetermined distance (e.g., 20 miles) of a specified location (e.g., the user's current location or another location); and (2) have been updated within a specified period of time (e.g., within the last hour). In particular embodiments, the system is adapted to allow the user to repeatedly execute the watch roulette feature in order to quickly survey the landscape of conversations that are occurring within a particular area within a particular time period.

In certain embodiments, the system is set up to prohibit users from replying to threads that are viewed using the watch roulette feature, unless the thread would have otherwise been visible to the user through one of the user's other watches. However, in other embodiments, users may reply to any threads displayed using this feature.

Automated Message Posting

Although messages are described elsewhere in this disclosure as being originated by a human user (e.g., by a person typing a message on their cell phone or other portable or non-portable electronic device), it should be understood that, in other embodiments, messages may be originated automatically by a computer system. For example, messages may be posted by a client computer that has access to certain events and the locations of those events. In particular embodiments, the client computer may be adapted so that, in response to the occurrence of a particular event, the client computer automatically posts information regarding the particular event on a map at a specific post location that corresponds to the event.

As a specific example, a central home alarm monitoring system may be adapted to monitor multiple homes for the presence of one or more alarm codes that may be automatically generated, for example, when a door or window within the home is opened while the home's alarm system is activated. In a particular embodiment, the home alarm monitoring system is adapted to post an appropriate alert message at a post location that corresponds to the position of the home on a map. This may serve to alert users, who are monitoring a watch area that includes the home, that the home's burglar alarm has been triggered. This may allow those in the immediate area to seek, or otherwise provide, appropriate assistance.

It should be understood that this type of automated message posting functionality may be used in a variety of contexts to automatically alert users of the occurrence and location of a particular event. Other examples of such events include inclement weather activity (e.g., tornados, hail or lightning), crime bulletins, and other types of events.

General Comments

The following comments apply to certain (but not necessarily all) specific embodiments of systems described in this document. It should be understood that some embodiments may include some of the features below and not others. Other embodiments may not include any of these features. Listed features:

A user with multiple user client devices can have multiple user client roaming watch areas.

For each user client device, a user may choose whether the user client creates and maintains a roaming watch area for that particular user client.

The user client will keep user client roaming watch area data on the system server in sync.

The user client will continuously monitor the user client device GPS location and update the corresponding user client roaming watch area on the system server.

Although user client roaming watch areas can be constantly changing, user client roaming watch areas are, in various embodiments, treated the same as static user watch areas by the system server.

A user client roaming watch area represents a standing request to receive notifications for any updates to message threads that touch that area.

In various embodiments, user clients stay in sync with the system server both in terms of configuration data (e.g., user watches) and message data (the various messages that the user is interested in). As shown, for example, in FIGS. 1-4, user clients may, for example, show users a current snapshot of the data the user has expressed interest in.

In particular embodiments, user interest in a particular thread or post location is deterministic (e.g., completely deterministic)—the system knows which users have interest in a particular thread and which users don't. The system enforces a consistent set of rules (that users can understand and depend on) to determine interest.

A single user can be associated with multiple clients. For example, a single user may be associated with client applications on the user's iPhone, iPad, and laptop computer.

In various embodiments, notification data gets "pushed" from the system server to user clients in following manner:

When the system server detects that a new message within a thread is of interest to a user, the system sends a notification to each user client for the user (e.g., user clients on the user's iPhone, iPad, and laptop computer).

The notification contains enough information to alert the user immediately that new data is pending and what the identifier of the new thread is.

When the new thread data is actually retrieved from the system server can vary. For example:

If the user client is already running, the user client will retrieve the data immediately.

If not, the user has been alerted and will see the updates next time they run the user client.

In various embodiments, user clients sync with the system server every time they start or detect updates.

SPECIFIC EXAMPLES

Various steps that are executed during of the operation of a system according to a particular embodiment are described below with reference to FIGS. 5-9. In this example:

User A is associated with watch area A1 and user client A1

User B is associated with watch area B1 and user client B1

User C is associated with watch area C1 and user client C1

User D is associated with watch area D1 and user client D1

User E is associated with watch area E1 and user client E1

User F is associated with watch area F1 and user client F1

User G is associated with roaming watch area G1, user client G1, and client device G1-device. (User client device G1-device is GPS-capable and user G has enabled roaming as watch area G1-roaming.)

Step 1: A First Thread T1 is Created and Posted as Follows:
- (A) User A posts a new message M1 and specifies a post location PL1 for this message. (See FIG. 5.) User A may specify the post location either manually (e.g., by specifying a location on a map displayed on User A's user client device or by specifying that User A's current location should be used as PL1). Message M1 is not a reply so it becomes the first message in thread T1.
- (B) The system establishes a subscription A-T1 which will cause the system to automatically send user A any updates to thread T1 (which may include, for example, any new messages that are posted to this message thread).
- (C) PL1 is within user B's watch area B1. Because of this, the system notifies user B's user client B1 that thread T1 is of interest to user B.
- (D) User B's user client B1 requests thread T1 data from the system server and presents thread T1 to user B (e.g., by displaying the text of the thread T1 on the user client device on which user B's user client B1 is installed).
- (E) The system establishes a subscription to thread T1 (subscription B-T1) for user B.
- (F) The system determines PL1 is not within watch areas for users C-G, and therefor does not take any further action in regard to notifying users C-G of this thread.

Step 2: A First Reply to Thread T1 is Created and Posted as Follows:
- (A) User B reads thread T1 on user client B1.
- (B) User B replies to thread T1 with new message M2 and specifies post location PL2 for message M2.
- (C) In response to subscription A-T1, the system notifies user client A1 that a new message (message M2) has been added to thread T1.
- (D) The system determines that PL2 is within user C's watch area C1 and notifies user client C1 that thread T1 is of interest.
- (E) The system establishes a subscription to thread T1 (subscription C-T1) for user C.
- (F) The system determines that PL2 is not within watch areas for users D-G, and therefor does not take any further action in regard to notifying users D-G of this thread.

Step 3: A Second Reply to Thread T1 is Created and Posted as Follows:
- (A) User C reads updated thread T1 on user client C1.
- (B) User C replies to thread T1 with a new message M3 and specifies post location PL3 for message M3.
- (C) In response to subscriptions A-T1 and B-T1, the system notifies user clients A1 and B1 that a new message (message M3) has been added to thread T1.
- (D) The system determines that PL3 is within both user D's watch area D1 and user E's watch area E1, and notifies user clients D1 and E1 that thread T1 is of interest.
- (E) The system establishes subscriptions to thread T1 (subscriptions D-T1 and E-T1, respectively) for users D and E.
- (F) The system determines that PL3 is not within a watch areas for users F and G, and therefor does not take any further action in regard to notifying users F and G of this thread.

Step 4: A Third Reply to Thread T1 is Created and Posted as Follows:
- (A) User A reads updated thread T1 on user client A1.
- (B) User A replies to thread T1 with a new message M4 and specifies post location PL4 for message M4 where PL4 is not equal to PL1.
- (C) In response to subscriptions B-T1 and E-T1, the system notifies user clients B1-E1 that a new message (message M4) has been added to thread T1.
- (D) The system determines that PL4 is within user F's watch F1, and notifies user client F1 that thread T1 is of interest.
- (E) The system establishes a subscription to thread T1 (subscription F-T1) for user F.

Step 5: System Handles a Roaming Watch Area as a Third Reply to Thread T1 is Created and Posted as Follows:

Note: User G watch area G1 is not touched by any of the locations of the messages above, PL1 thru PL4.
- (A) User G is initially at roaming location RL1 (See FIG. 5.)
- (B) User client G1 updates user client roaming watch G1 roaming data on the system server with location RL1.
- (C) User G moves to location RL2. (See FIG. 6.)
- (D) User client G1 updates user client roaming watch G1 roaming data on the system server with location RL2.
- (E) User G moves to location RL3. (See FIG. 7.)
- (F) User client G1 updates user client roaming watch G1-roaming data on the system server with location RL3. Location RL3 is near user B.
- (G) A fourth reply to thread T1 is created.
- (H) User B reads updated thread T1 on client B1.
- (I) User B replies to thread T1 with new message M5 at post location PL5.
- (J) In response to subscriptions A-T1 and C-T1 thru F-T1, the system notifies user clients A1 and C1 thru F1 that a new message (message M5) has been added to thread T1.
- (K) The system determines that PL5 is within user watch G1-roaming, which is currently centered on location RL3.
- (L) The system notifies user client G1 that thread T1 is of interest.
- (M) The system establishes a subscription to thread T1 (subscription G-T1) for user G.

Step 6: A Fifth Reply to Thread T1 is Created and Posted as Follows:
- (A) User G reads updated thread T1 on user client G1.
- (B) User G replies to thread T1 with a new message M6 and specifies post location PL6 for message M6.
- (C) In response to subscriptions A-T1-F-T1, the system notifies user clients A1-F1 that a new message (message M6) has been added to thread T1.
- (D) User G moves to location RL4, which is far away from post locations PL1 thru PL6.
- (E) User client G1 updates user client roaming watch G1-roaming data on the system server with location RL4. (See FIG. 8.)

Step 7: A Sixth Reply to Thread T1 is Created and Posted as Follows:
(A) User C reads updated thread T1 on user client C1.
(B) User C replies to thread T1 with a new message M7 and specifies post location PL7 for message M7. (See FIG. 9.)
(C) In response to subscriptions A-T1, B-T1, and D-T1 through G-T1, the system notifies user clients A1, B1, and D-G that a new message (message M7) has been added to thread T1.

Exemplary Technical Platforms

As will be appreciated by one skilled in the relevant field, in light of this disclosure, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

Figure 10:
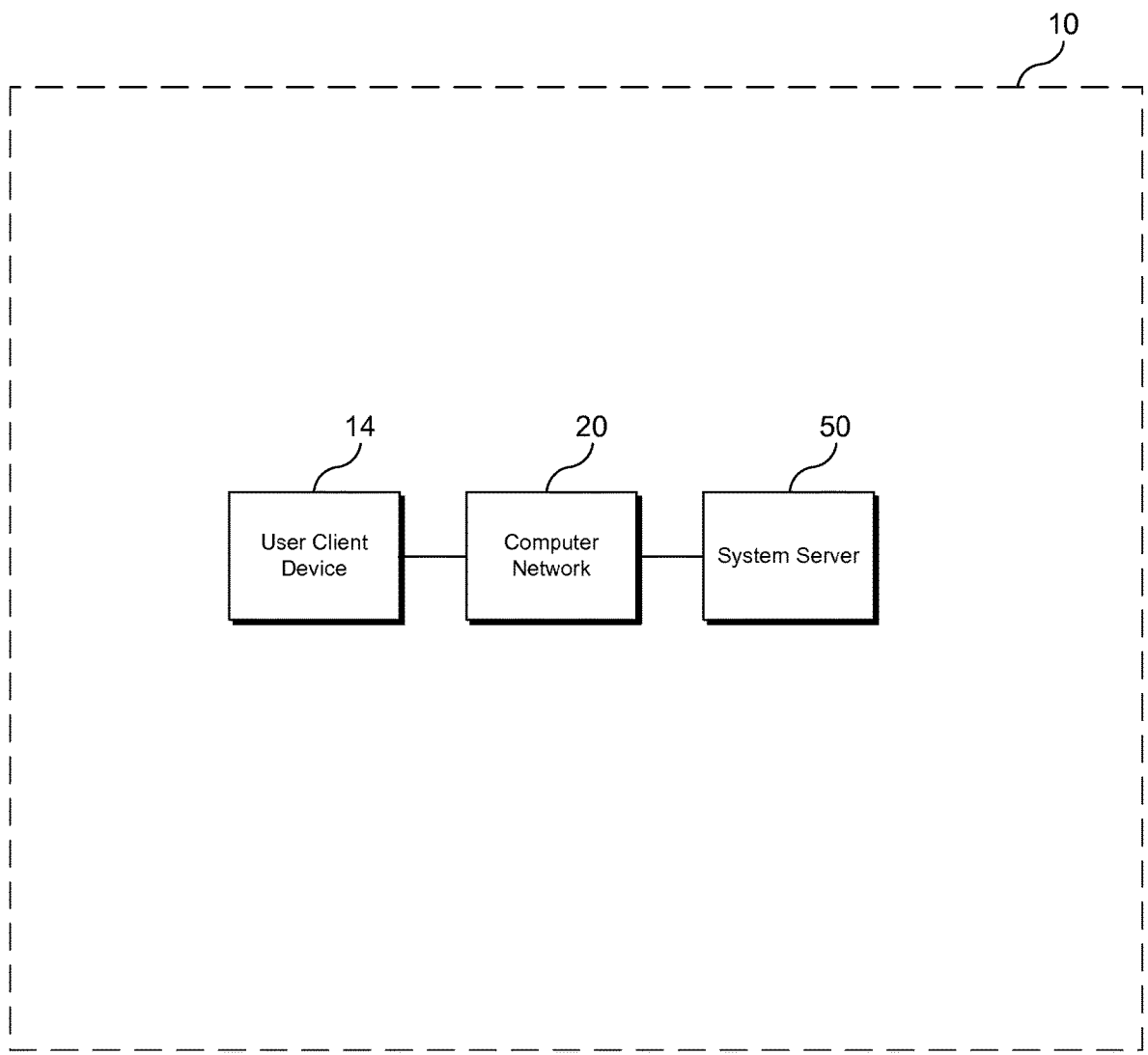
FIG. 10 is a block diagram of an electronic messaging system according to a particular embodiment.
Figure 11:
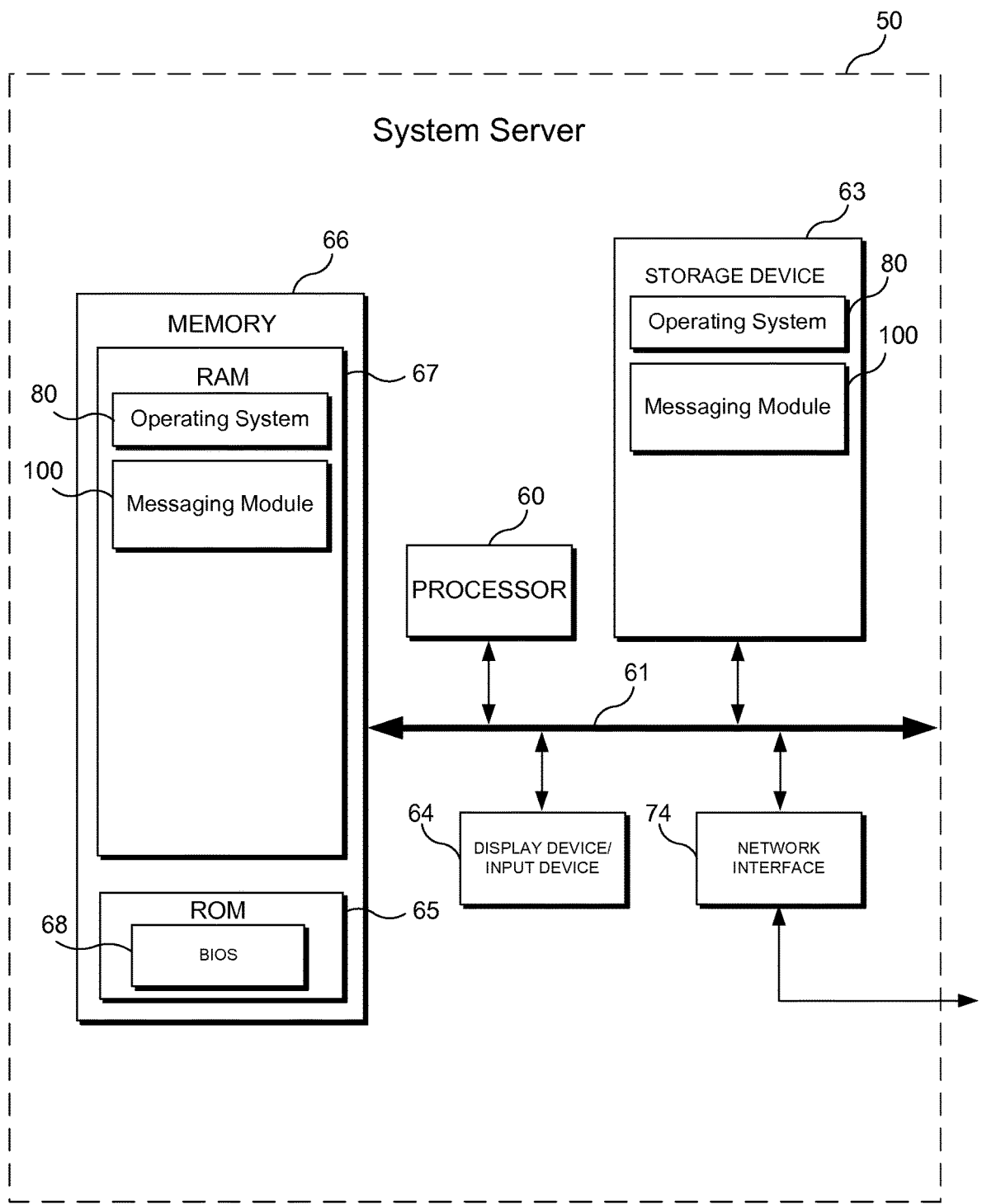
FIG. 11 is a schematic diagram of a system server according to various embodiments.

FIG. 10 shows an Electronic Messaging System 10 according to a particular embodiment. As may be understood from this figure, the Electronic Messaging System 10 includes a System Server 50, one or more computer networks 20, and at least one User Client Device 14. The one or more computer networks 20 facilitate communication between the User Client Device 14 and the System Server 50. These one or more computer networks 20 may include any of a variety of types of computer networks such as the Internet, a private intranet, a public switch telephone network (PSTN), or any other type of network known in the art. In certain variations of the embodiment shown in FIG. 1, both the communication link between the User Client Device 14 and the System Server 50 are implemented via the Internet using Internet protocol (IP).

FIG. 2 shows a block diagram of an exemplary embodiment of the System Server 50 of FIG. 1. The System Server 50 includes a processor 60 that communicates with other elements within the System Server 50 via a system interface or bus 61. Also included in the System Server 50 is a display device/input device 64 for receiving and displaying data. This display device/input device 64 may be, for example, a keyboard, voice recognition, or pointing device that is used in combination with a monitor. The System Server 50 further includes memory 66, which preferably includes both read only memory (ROM) 65 and random access memory (RAM) 67. The server's ROM 65 is used to store a basic input/output system 68 (BIOS) that contains the basic routines that help to transfer information between elements within the System Server 50.

In addition, the System Server 50 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide non-volatile storage for the System Server 50. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, and a Messaging Module 100. The Messaging Module 100 control certain aspects of the operation of the System Server 50 with the assistance of the processor 60 and an operating system 80.

Also located within the System Server 50 is a network interface 74 for interfacing and communicating with other elements of a computer network. It will be appreciated by one of ordinary skill in the art that one or more of the System Server 50 components may be located geographically remotely from other System Server 50 components. Furthermore, one or more of the components may be combined, and additional components performing functions described herein may be included in the System Server 50.

Alternative Embodiments

Shared Watch Areas

In various embodiments, the system is configured to define one or more shared watch areas which may, for example, not be tied to a particular user. For example, the system may be configured to define a watch area or enable a user to define a watch area for a park, (e.g., such as central park in New York City); a particular landmark; a path or trail (e.g., such as the Appalachian Trail or other hiking trail, a neighborhood, or any other suitable region). In various embodiments, a shared watch area may be defined by an area bounded by one or more electronic markers (e.g., one or more iBeacons). In particular embodiments, the watch area may be defined by a shape of the area and may, for example, include surrounding areas. In various embodiments, the system is configured to associate a plurality of users with the shared watch area (e.g., residents of the particular neighborhood, etc.).

In various embodiments, the system is configured to enable users to elect to substantially automatically subscribe to a particular shared watch area based at least in part on a user's proximity to the particular shared watch area. In particular embodiments, the system is configured to determine that a user is located in a shared watch area (e.g., based on a GPS position of the user determined from a mobile device associated with the user), and to substantially automatically subscribe the user to the shared watch area in response to making that determination (e.g., to add the shared watch area to the user's existing watch area). In such embodiments, the systems may be configured to substantially automatically unsubscribe the user from the particular shared watch area in response to determining that the user is no longer located within (e.g., or near) the particular shared watch area. In still other embodiments, the system may be configured to subscribe a user to a particular shared watch area at least partially in response to a determination by the system that a roaming watch area associated with the user at least partially overlaps with the particular shared watch area.

Proximity Message Notification

In various embodiments, the system is configured to notify a client device associated with a first user that a new thread has been posted or may be of interest to the first user via a client device associated with a second user. In particular embodiments, the system may be configured to notify the first user via the second user's client device in response to determining that the client device associated with the first user is proximate the client device associated with the second user (e.g., the client devices are within a particular distance of one another). In various embodiments, the system may determine any suitable proximity such as, for example, within 100 feet, within 250 feet, within 50 yards, or any other suitable proximity. In some embodiments, the system is configured to transmit the notification substantially directly between client devices using Bluetooth, Low Energy Bluetooth, Near Field Communication, or any other suitable technique.

Proximity Message Relay

In various embodiments, the system may be configured to relay threads and/or messages such as the proximity messages discussed immediately above. For example, the system may be configured to relay a proximity message from the client device associated with the first user described above that has received the proximity message to one or more client devices associated with one or more third users. In various embodiments, the one or more third users may be proximate the first user (e.g., within a particular distance of the first user), but not proximate the second user described above. In various embodiments, this functionality may enable one or more threads or messages to propagate from a particular location or user to nearby users to whom the message or thread may be of interest. In a particular example, if a robbery occurs at a particular street corner, users near the corner may receive or post a message regarding the robbery, which would then be transmitted (e.g., via Bluetooth, near field communications, etc.) to one or more nearby users' client devices.

Traveling Thread

In various embodiments, threads and messages may be associated with a particularly shaped area rather than a specific GPS location. For example, a thread related to a particular crime may be associated with a circular area having a radius of one mile from the location of the commission of the crime. In such embodiments, a user having a watch area that at least partially intersects (e.g., overlaps) the circular area may receive and/or subscribe to the thread even if the actual location of the crime is not within the user's watch area.

Social Endorsement

In various embodiments the system is configured to utilize social networking data associated with a user when determining whether to subscribe that user to a particular thread. The system may be configured, for example, to determine social networking data associated with a user such as the user's friends, connections, followers, follows, contacts, interactions, etc. on one or more social networks (e.g., Facebook, Twitter, LinkedIn, Instagram, etc.). In particular embodiments, the system is configured to subscribe a user to a particular thread when that thread falls within one or more of the user's watch areas and the thread contains one or more messages that, for example, have been posted, replied to, commented on, liked or otherwise interacted with by one or more persons to whom the user is connected via one or more social networks.

Conclusion

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for automatically analyzing computer code to determine whether computer software associated with the computer code collects personal data, the method comprising:
   receiving, at one or more computer processors from a first user, one or more user watch area attributes;
   defining, by one or more computer processors, a user watch area based at least in part on the one or more user watch area attributes;
   receiving, at one or more computer processors from a second user, a message associated with a particular geographical location;

determining, by one or more computer processors, that the particular geographical location is associated with the user watch area;

at least partially in response to determining that the particular geographical location is associated with the user watch area, subscribing, by one or more computer processors, the first user to a thread of messages that includes the message; and dynamically adjusting a shape of the user watch area based, at least in part, on an attribute of message postings associated with the user watch area, wherein the attribute of the message postings comprises a number of message postings associated with the user watch area, by:

determining that the number of message postings associated with the user watch area is below a predefined threshold; and dynamically adjusting the shape of the user watch area further based, at least in part, on determining that the number of message postings associated with the user watch area is below the predefined threshold.

2. The computer-implemented data processing method of claim 1, wherein the method comprises dynamically adjusting the shape of the user watch area based, at least in part, on an attribute of the geographical area associated with the user watch area; and wherein the attribute of the geographical area associated with the user watch area comprises a population density of the geographical area associated with the user watch area.

3. The computer-implemented data processing method of claim 1, further comprising relaying the message associated with a particular geographical location from a client device associated with the second user to a client device associated with the first user using near field communications.

4. The computer-implemented data processing method of claim 1, wherein the thread of messages includes a second message that was contributed to the thread of messages before the defining of the user watch area.

5. The computer-implemented data processing method of claim 1, wherein the one or more user watch area attributes comprises social networking data associated with the first user; and wherein defining the user watch area based at least in part on the one or more user watch area attributes comprises defining the user watch area based at least in part on the social networking data associated with the first user.

6. A non-transitory computer-readable medium storing computer-executable instructions for:

receiving one or more user watch area attributes from a first user;

defining a watch area based on the one or more user watch area attributes;

receiving a message from a second user;

associating the message with a particular geographical location;

determining that the particular geographical location is associated with the defined user watch area;

at least partially in response to determining that the particular geographical location is located within the defined user watch area, subscribing the first user to a thread of messages that includes the message; and redefining a size of the defined user watch area based at least in part on a number of message postings associated with the defined user watch area.

7. The non-transitory computer-readable medium of claim 6, wherein the non-transitory computer-readable medium further stores computer-executable instructions for:

receiving an instruction from the second user to associate the message with the particular geographical location; and associating the message with that particular geographical location based at least in part on receiving the instruction.

8. The non-transitory computer-readable medium of claim 6, wherein determining that the particular geographical location is associated with the defined user watch area comprises determining that the particular geographical location is adjacent to the defined user watch area.

9. The non-transitory computer-readable medium of claim 6, wherein determining that the particular geographical location is associated with the defined user watch area comprises determining that the particular geographical location is within the defined user watch area.

10. The non-transitory computer-readable medium of claim 6, wherein defining the watch area based on the one or more user watch area attributes comprises defining the watch area based on the one or more user watch area attributes relative to a geographical location of a computing device associated with the first user.

11. The non-transitory computer-readable medium of claim 6, wherein the non-transitory computer-readable medium further stores computer-executable instructions for:

receiving one or more second user watch area attributes from the first user;

based on the one or more second user watch area attributes, unsubscribing the first user from the thread of messages that includes the message.

\* \* \* \* \*